United States Patent [19]
Sandy

[11] Patent Number: 5,561,969
[45] Date of Patent: Oct. 8, 1996

[54] APPARATUS FOR SUPPORTING A CUTTING DEVICE

[76] Inventor: Floyd R. Sandy, 1462 Napier Rd., Hohenwald, Tenn. 38462

[21] Appl. No.: 497,376

[22] Filed: Jun. 30, 1995

[51] Int. Cl.⁶ .................................................. A01D 34/00
[52] U.S. Cl. ...................... 56/13.6; 56/12.7; 56/DIG. 9
[58] Field of Search ...................... 56/13.6, 13.7, 56/16.9, DIG. 9, 12.1, 12.7, 13.5, 16.7; 30/276

[56] References Cited

U.S. PATENT DOCUMENTS

| | | | |
|---|---|---|---|
| 3,508,384 | 4/1970 | Madre | 56/25.4 |
| 4,152,882 | 5/1979 | Howard | 56/13.7 |
| 4,242,855 | 1/1981 | Beaver, Jr. | 56/13.7 |
| 4,642,976 | 2/1987 | Owens | 56/16.9 |
| 4,663,920 | 5/1987 | Skovhoj | 56/12.7 |
| 4,949,536 | 8/1990 | Neufeld | 56/13.7 |
| 5,303,532 | 4/1994 | Phillips | 56/12.7 |

*Primary Examiner*—Terry Lee Melius
*Attorney, Agent, or Firm*—Walker, McKenzie & Walker, P.C.

[57] ABSTRACT

An apparatus for supporting a cutting device from a vehicle and for allowing the operator of the vehicle to use the cutting device while the cutting device is supported from the vehicle. The cutting device includes an elongated shaft, a cutting head attached to one end of the shaft, and a drive mechanism for activating the cutting head. The apparatus includes a base for attachment to the vehicle; a support arm member having a first end for attachment to the base, having a midportion, and having a second end; and hanger structure attached to the support arm for suspending the cutting device from the support arm.

9 Claims, 3 Drawing Sheets

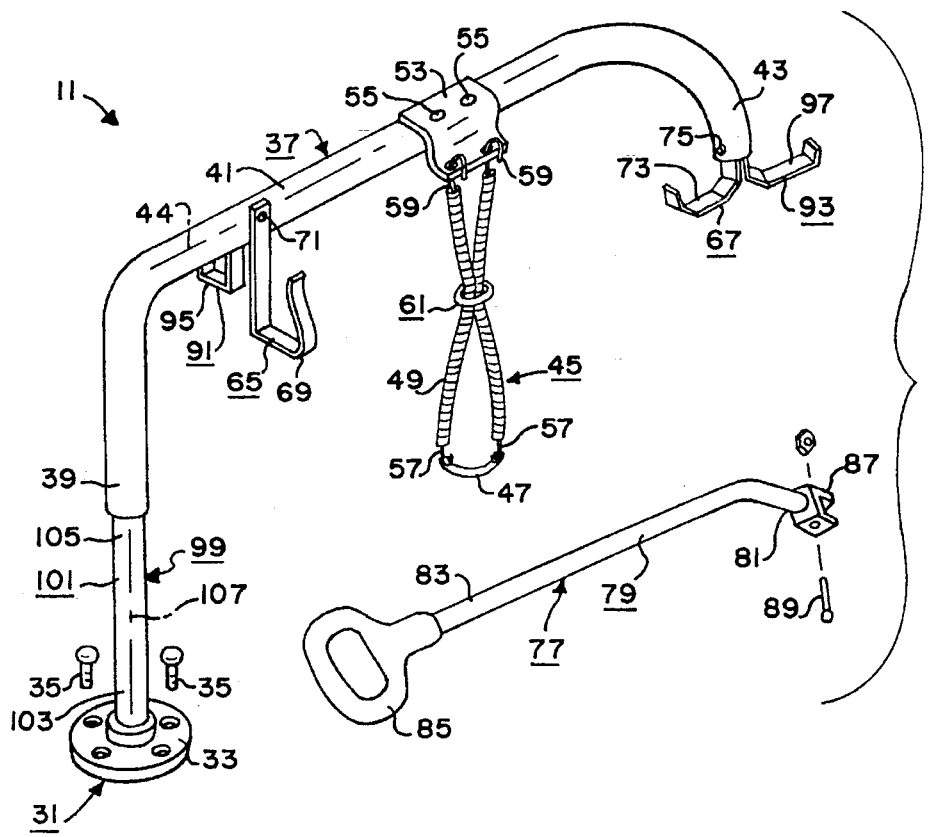
FIG. 1
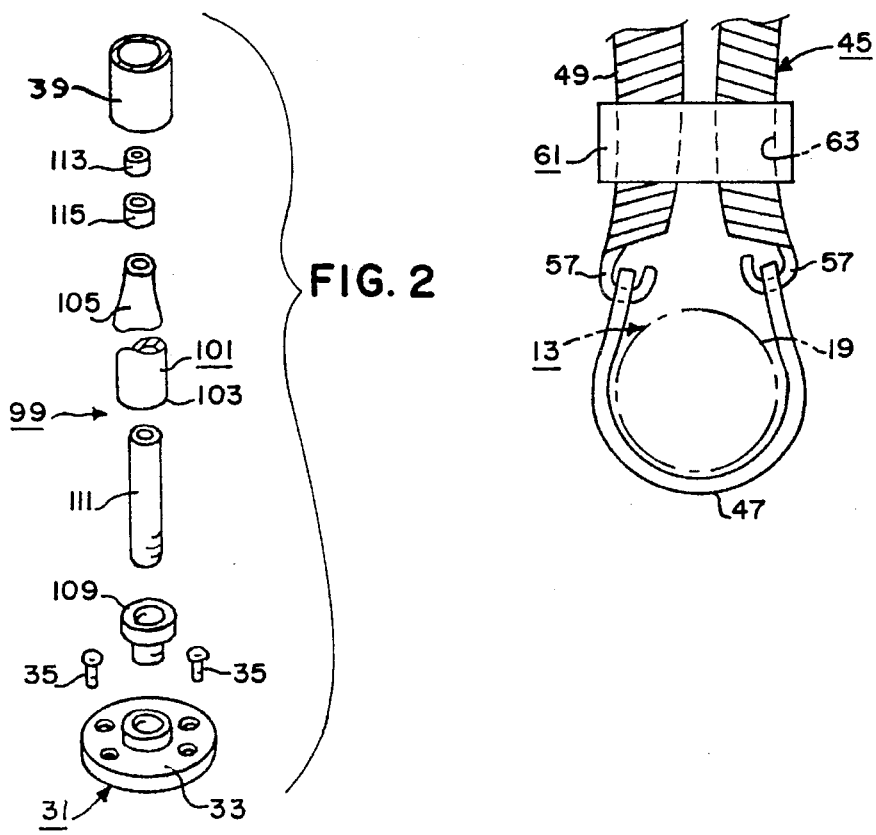
FIG. 2
FIG. 3

APPARATUS FOR SUPPORTING A CUTTING DEVICE

BACKGROUND OF THE INVENTION

1. Field of the Invention

The present invention relates, in general, to an apparatus for supporting a cutting device from a vehicle and for allowing the operator of the vehicle to use the cutting device from the vehicle.

2. Information Disclosure Statement

A preliminary patentability search conducted in class 56, subclasses 12.7, 16.9, 10.7 and 13.7 produced the following patents which appear to be relevant to the present invention:

Madre, U.S. Pat. No. 3,508,384, issued Apr. 28, 1970, discloses a control mounting assembly for the attachment of an auxiliary mowing apparatus on a powered main mower, the assembly being articulated for positioning at inclined operating angles. The auxiliary mower has rotatable caster wheels for engaging the ground.

Howard, U.S. Pat. No. 4,152,882, issued May 8, 1979, discloses a vegetation cutting assembly including an elongated, flexible cable having a first end for attachment to the drive shaft of the motor of a lawn mower, tractor, power drill or the like and having a second end for attachment to the cutting head of a string trimmer so that the cutting head of the string trimmer can be rotated by the drive shaft of the motor of the lawn mower, etc.

Beaver, U.S. Pat. No. 4,242,855, issued Jan. 6, 1981, discloses a lawn mower auxiliary unit with a flexible drive shaft having a first end for attachment to the drive shaft of the motor of the lawn mower and having a second end for attachment to the cutting head of a string trimmer so that the cutting head of the string trimmer can be rotated by the drive shaft of the motor of the lawn mower.

Owens, U.S. Pat. No. 4,642,976, issued Feb. 17, 1987, discloses a mounting assembly for mounting the cutting head of a string trimmer on a lawn mower. The cutting head of the string trimmer is rotated either by a flexible drive shaft having a first end attached to the drive shaft of the motor of the lawn mower and having a second end attached to the cutting head, or by an electric motor electrically coupled to the electrical power circuit of the motor of the lawn mower when the motor of the lawn mower is itself an electric motor.

Skovhoj, U.S. Pat. No. 4,663,920, issued May 12, 1987, discloses a string trimmer mounted to the chassis of a lawn tractor or the like by way of a parallelogram unit with the cutting head of the string trimmer rotated by a hydraulic motor that is connected to the hydraulic system of the lawn tractor, etc.

Neufeld, U.S. Pat. No. 4,949,536, issued Aug. 21, 1990, discloses a string trimmer adjustably mounted to the chassis of a lawn tractor or the like by way of a framework including various gears, electric motors and the like with the cutting head of the string trimmer rotated by an electric motor that is connected to the electrical system of the lawn tractor, etc.

Phillips, U.S. Pat. No. 5,303,532, discloses a mowing system capable of being pulled behind a tractor or other prime mover. The mowing system includes a support apparatus for supporting a grass cutter adapted to cut grass as the cutter is rotated and moved forwardly into cutting relationship with grass. The support apparatus includes a wheeled frame for supporting the cutter for rotation and includes a guard disposed on the forward side of the cutter.

Nothing in the known prior art discloses or suggests the present invention. More specifically, nothing in the known prior art discloses or suggests an apparatus for supporting a cutting device from a vehicle and for allowing the operator of the vehicle to use the cutting device while the cutting device is supported from the vehicle, and including a base for attachment to the vehicle, a support arm member for attachment to the base, and hanger means attached to the support arm for suspending the cutting device from the support arm.

SUMMARY OF THE INVENTION

The apparatus of the present invention is designed to be attached to a riding lawn mower or the like and to support a string-type grass trimmer or the like from the riding lawn mower in such a manner that the operator of the riding lawn mower can use the string-type grass trimmer to cut grass and the like adjacent the riding lawn mower without stepping off of the riding lawn mower and without supporting the full weight of the string-type grass trimmer.

The apparatus of the present invention supports a cutting device from a vehicle and allows the operator of the vehicle to use the cutting device while the cutting device is supported from the vehicle. More specifically, the apparatus of the present invention includes a base for attachment to the vehicle, a support arm member for attachment to the base, and hanger means attached to the support arm for suspending the cutting device from the support arm.

One object of the present invention is to provide an apparatus for supporting a cutting device from a vehicle which is easy to mount and dismount from the vehicle without tools after the initial installation thereof.

Another object of the present invention is to provide such an apparatus which includes quick hitch means for allowing the cutting device to be quickly removed therefrom when desired to cut out of reach places.

Another object of the present invention is to provide such an apparatus with supply hooks or the like for keeping supplies within reach.

Another object of the present invention is to provide such an apparatus which allows the cutting device to be maintained, re-fueled, etc., without requiring the operator to dismount the vehicle.

Another object of the present invention is to provide such an apparatus which includes control means for allowing precise cutting around small plants and the like.

Another object of the present invention is to provide such an apparatus which is light weight.

Another object of the present invention is to provide such an apparatus which is affordable.

Another object of the present invention is to provide such an apparatus which reduces the soiling of the operator's clothing and footwear.

Another object of the present invention is to provide such an apparatus which allows a person with one leg or other disabilities to operate the cutting device.

Another object of the present invention is to provide such an apparatus which swivels 180° to allow selective cutting, etc.

BRIEF DESCRIPTION OF THE DRAWINGS

FIG. 1 is a perspective view of the apparatus of the present invention.

FIG. 2 is a exploded perspective view of a portion of the apparatus of the present invention.

FIG. 3 is a sectional view of a portion of the apparatus of the present invention shown attached to a vehicle.

DESCRIPTION OF THE PREFERRED EMBODIMENT

Figure 4:
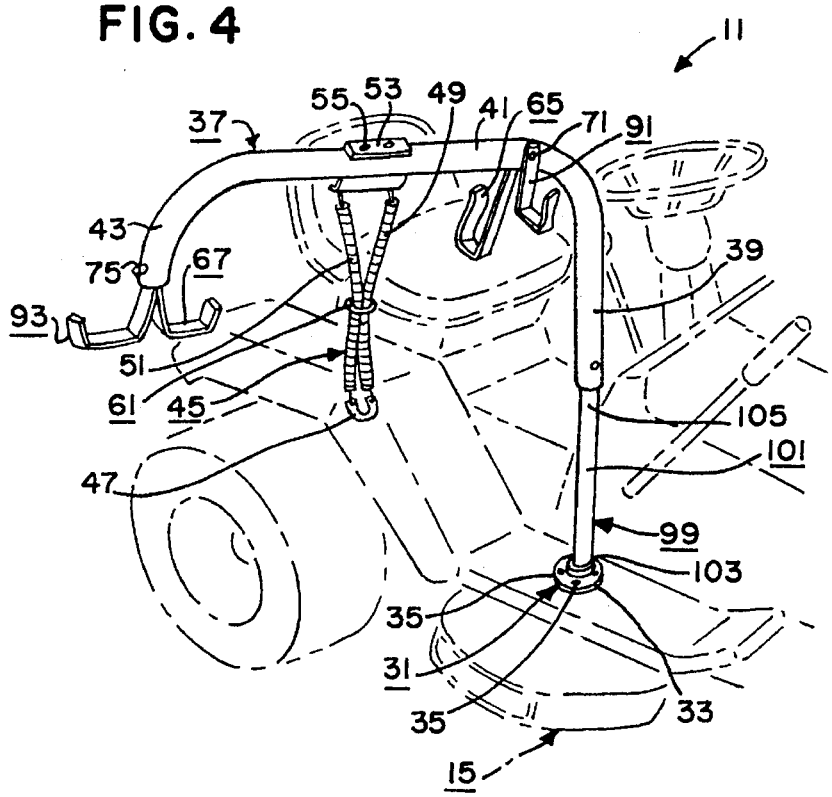
FIG. 4 is a perspective view of the apparatus of the present invention shown attached to a vehicle.
Figure 5:
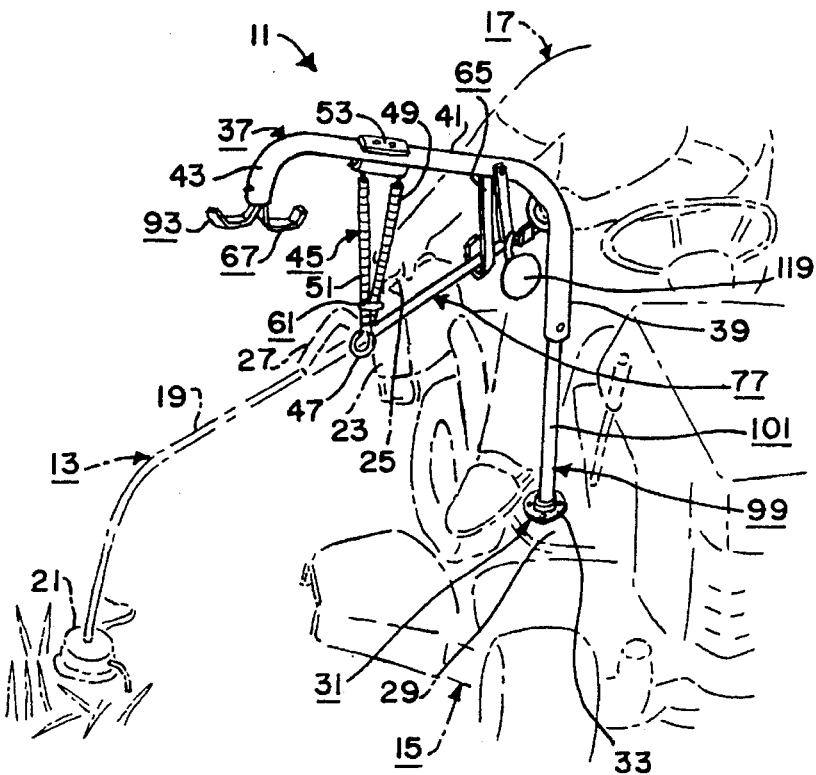
FIG. 5 is a perspective view similar to FIG. 4 but showing the apparatus supporting a cutting device and showing the operator of the vehicle using the cutting device from the vehicle.

A preferred embodiment of the apparatus of the present invention is shown in FIGS. 1–6, and identified by the numeral 11. The apparatus 11 is especially designed to support a cutting device 13 from a vehicle 15 and for allowing the operator 17 of the vehicle 15 to use the cutting device 13 while the cutting device 13 is supported from the vehicle 15. The cutting device 13 preferably consist of a typical string-type grass or weed cutter including an elongated body or shaft 19, a cutting head 21 attached to one end of the shaft 19, and means for activating the cutting head 21 such as a gasoline motor 23 or the like. Such a cutting device 13 typically includes a first grip member 25 positioned at the end of the shaft 19 opposite the cutting head 21 (e.g., on the motor 23), and a second grip member 27 positioned on the shaft 19 between the opposite ends thereof. The vehicle 15 preferably consist of a typical ride-on lawn mower or tractor but, as used herein, may include standard ride-on lawn mowers and tractors, self-propelled lawn mowers and tractors, all-terrain vehicles, and the like, having a deck 29.

The apparatus 11 includes a base 31 for attachment to the vehicle 15. The base 31 preferably includes a typical flange 33 such as an American Standard cast-iron pipe flange or the like for being attached to the upper surface of the deck 29 of the vehicle 15 with bolts 35 or the like at any desired location selected by the operator 17 or the like as clearly shown in FIGS. 4–6.

The apparatus 11 includes a support arm member 37 having a first end 39 for attachment to the base 31, having a midportion 41, and having a second end 43. The support arm member 37 is preferably constructed from an elongated length of rigid metal tubing with an outside diameter of approximately 1.5 inches (3.81 centimeters) bent to form a generally inverted U-shaped member as clearly shown in the drawings. The first end 39 may have a length of approximately 11.5 inches (29.21 centimeters). The midportion 41 may have a length of approximately 29 inches (73.66 centimeters) with a longitudinal axis 44. The second end 43 may have a length of approximately 6 inches (15.24 centimeters).

The apparatus 11 includes hanger means 45 attached to the support arm 37 for suspending the cutting device 13 from the support arm 37. The hanger means 45 is preferably flexible to allow the cutting device 13 to be moved while suspended from the support arm 37 by the hanger means 45. The hanger means 45 preferably includes a saddle member 47 for supportingly receiving a portion of the shaft 19 or similar portion of the cutting device 13. The saddle member 47 may be molded or otherwise constructed from substantially rigid plastic or the like (e.g., standard polyvinyl chloride) with an upper surface shaped and sized so as to cradle a portion of the shaft 19 or similar portion of the cutting device 13. The hanger means 45 preferably includes a first support member 49 extending between one end of the saddle member 47 and the support arm 37, and a second support member 51 extending between the other end of the saddle member 47 and the support arm 37. The support members 49, 51 thus coact to attach the saddle member 47 to the support arm 37. The hanger means 45 preferably includes a bracket member 53 attached to the midportion 41 of the support arm 37 by screws 55 or the like for allowing the support members 49, 51 to be attached to the support arm 37. Each support member 49, 51 is preferably flexible and elastic to allow easy movement of the cutting device 13 when the cutting device 13 is supported by the hanger means 45. More specifically, each support member 49, 51 may consist of an elongated coil spring or the like having a hook 57 at one end for attachment to one end of the saddle member 47 and having a hook 59 at the other end for attachment to the bracket member 53 as will now be apparent to those skilled in the art. The hanger means 45 preferably includes a ring member 61 having an aperture 63 through which both support members 49, 51 extend. The ring member 61 can be slid toward and away from the saddle member 47 to trap the shaft 19 or similar portion of the cutting device 13 between the saddle member 47 and the support members 49, 51 are to allow the shaft 19 or similar portion of the cutting device 13 to be easily inserted into or removed from the saddle member 47 as will now be apparent to those skilled in the art. The ring member 61 may be molded or otherwise constructed from substantially rigid plastic or the like (e.g., standard polyvinyl chloride).

The apparatus 11 preferably includes a first holder 65 attached to the support arm 37 for holding a portion of the cutting device 13, and preferably includes a second holder 67 attached to the support arm 37 for holding another portion of the cutting device 13. The first holder 65 preferably includes a hook 69 attached to the support arm 37 adjacent the first end 39 thereof by a bolt 71 or the like. The second holder 67 preferably includes a hook 73 attached to the support arm 37 adjacent the second end 43 thereof by a bolt 75 or the like for hooking onto a portion of the cutting device 13. The hooks 69, 73 may be bent or otherwise formed out of substantially rigid metal or the like as will now be apparent to those skilled in the art.

The apparatus 11 preferably includes control handle means 77 for allowing the operator 17 of the vehicle 15 to precisely and easily control the position of the cutting head 21 of the cutting device 13 from the vehicle 15. The control handle means 77 preferably includes a body member 79 having a first end 81 for attachment to the cutting device 13 and having a second end 83. The body member 79 may consist of an elongated, rigid rod or the like. A grip member 85 is preferably provided at the second end 83 of the body member 79 to allow the operator 17 of the vehicle 15 to securely grip the control handle means 77 with one hand, etc. A U-shaped coupling member 87 or the like is preferably provided at the first end 81 of the body member 79 to allow the control handle means 77 to be securely attached to the shaft 19, etc., of the cutting device 13 by a bolt 89 or the like.

The hook 69 of the first holder 65 is preferably designed for hooking onto a portion of the control handle means 77. More specifically, the hook 69 is preferably designed for hooking onto the second end 83 of the body member 79 adjacent the grip member 85 as clearly shown in FIGS. 5 and 6.

The hook 73 of the second holder 67 is preferably designed for hooking onto a portion of the cutting device 13.

Figure 6:
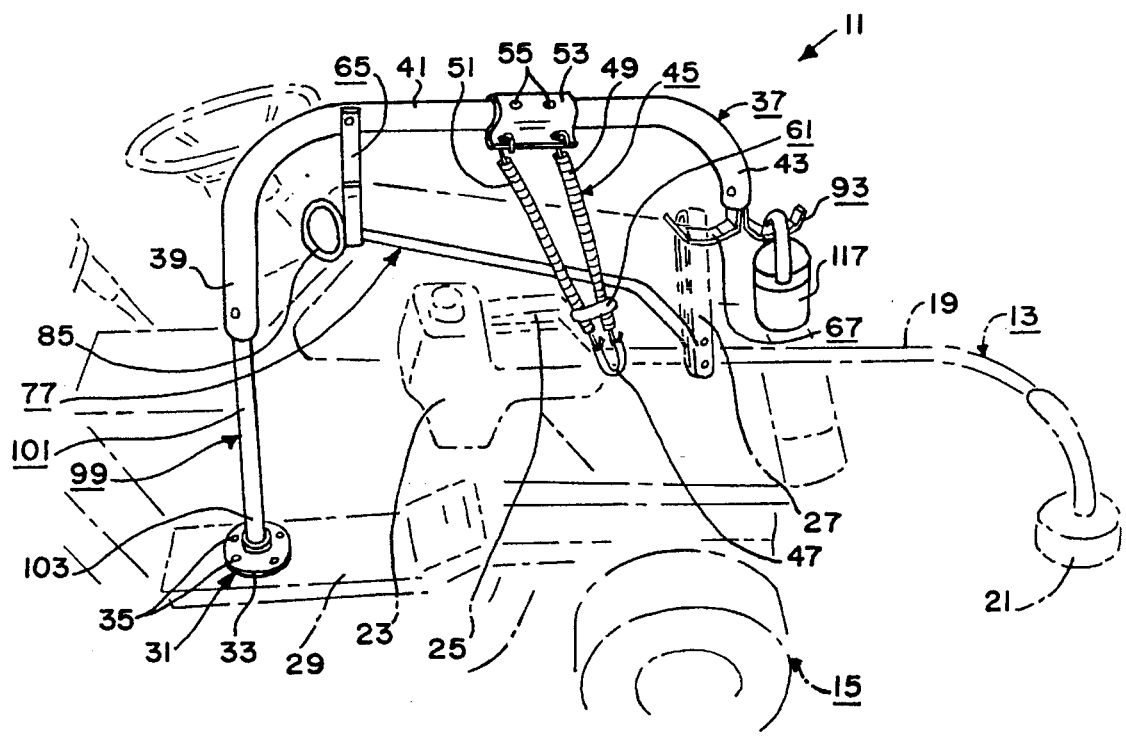
FIG. 6 is a perspective view similar to FIG. 4 but showing the apparatus supporting a cutting device and an auxiliary item.

More specifically, the hook 73 may be designed for hooking onto the second grip member 27 of the cutting device 13 as clearly shown in FIG. 6.

The apparatus 11 preferably includes a first auxiliary holder 91 attached to the support arm 37 for holding some article or the like, and preferably includes a second auxiliary holder 93 attached to the support arm 37 for holding another article or the like. The first auxiliary holder 91 preferably includes a hook 95 attached to the support arm 37 adjacent the first end 39 thereof by the bolt 71 or the like used to attach the hook 69 of the first holder 65 to the support arm 37. The second auxiliary holder 93 preferably includes a hook 97 attached to the support arm 37 adjacent the second end 43 thereof by the bolt 75 or the like used to attach the hook 73 of the second holder 67 to the support arm 37. The hooks 95, 97 may be bent or otherwise formed out of substantially rigid metal or the like as will now be apparent to those skilled in the art.

The apparatus 11 preferably includes attachment means 99 for rotatably attaching the support arm 37 to the base 31 at a convenient distance above the deck 29 of the vehicle 15 depending on the desires of the operator 17, etc., to allow the operator 17 of the vehicle 15 to move the cutting head 21 of the cutting device 13 in an arc about the base 31 while the cutting device 13 remains suspended from the support arm 37. The attachment means 99 preferably includes a post 101 having a first end 103 for attachment to the base 31 and having a second end 105 for rotational attachment relative to the first end 39 of the support arm 37. The post 101 preferably has a longitudinal axis 107 and is attached to the base 31 with the longitudinal axis 107 substantially normal or perpendicular to the plane or surface of the deck 29 of the vehicle 15 (i.e., substantially when the vehicle 15 is supported on a substantially horizontal piece of ground or the like). With the longitudinal axis 107 held substantially normal or perpendicular to the plane of the deck 29 of the vehicle 15 (i.e., normally held substantially vertical), the longitudinal axis 44 of the midportion 41 of the support arm 37 will be held substantially parallel to the plane or surface of the deck 29 of the vehicle 15 (i.e., generally horizontal) as will now be apparent to those skilled in the art. The post 101 may be constructed out of standard metal tubing having a 1 inch (2.54 centimeters) outside diameter and a length sufficient to located the support arm 37 the desired distance above the upper surface of the deck 29 of the vehicle 15. The first end 103 of the post 101 may be attached to the base 31 in any manner now apparent to those skilled in the art such as, for example, by way of a standard reducer bushing 109 and a standard 8 inch (20.32 centimeters) nipple 111 as shown in FIG. 2. The second end 105 of the post 101 may be attached to the first end 39 of the support arm 37 in any manner now apparent to those skilled in the art such as, for example, by way of a pair of squeeze type bushings 113, 115 sized to fit within the hollow first end 39 of the support arm 37 between the support arm 37 and the second end 105 of the post 101, etc. The second end 105 of the post 101 is preferably swaged 1/16 inch (0.15875 centimeters) smaller to receiving the bushings 113, 115 as will now be apparent to those skilled in the art.

To use the apparatus 11, the base 31 is merely attached to the deck 29 at a desired location depending on the size of the vehicle 15 and the operator 17, etc., using the bolts 35, etc. Because the base 31 is generally flat, it can be left on the deck 29 when the apparatus 11 is not in use. That is, the support arm 37 and attachment means 99 can be easily removed from the base 31 by merely unscrewing the reducer bearing 109 from the base 31, etc., as will now be apparent to those skilled in the art. With the base 31 attached to the deck 29 and the support arm 37 rotatably attached to the base 31 through the attachment means 99, the cutting device 13 can be easily suspended from the support arm 37 by merely placing the saddle member 47 beneath a portion of the shaft 19 of the cutting device 13, preferably at a location where the cutting device 13 will be generally balanced on the saddle member 47, etc. The ring member 61 can then be slid down around the support members 49, 51 toward the shaft 19 to substantially tightly hold the shaft 19 on the saddle member 47 as shown in FIG. 3. If desired, the control handle means 77 can be attached to the cutting device 13 by attaching the coupling member 87 to any convenient portion of the cutting device 13 such as, for example, by tightly clamping the U-shaped coupling member 87 about the shaft 19 with the bolt 89 as will now be apparent to those skilled in the art. The cutting device 13 can then be held in an out-of-use position on the support arm 37 by merely hooking the second grip member 27 of the cutting device 13 onto the hook 73 of the second holder 67 and hooking the first end 81 of the body member 79 of the control handle means 77 on the hook 69 of the first holder 65. To use the cutting device 13, the operator 17 of the vehicle 15 merely unhooks the cutting device 13 from the hooks 73, 69 and, leaving the cutting device suspended from the hanger means 45, swings the cutting head 21 of the cutting device 13 to the desired locations, etc. The combination of the flexible hanger means 45 and the rotatable support arm 37 allows the operator 17 to freely move the cutting head 21 of the cutting device 13 in an arc about the longitudinal axis 107 of the post 101 while the cutting device 13 remains suspended from the support arm 37. Auxiliary items such as gas cans 117, canteens 119 and the like can be supported from the hooks 95, 97 as will now be apparent to those skilled in the art.

As thus constructed and used, the present invention provides an apparatus that allows a cutting device to be easily mounted and dismounted from a vehicle without tools after the initial installation; that allows the cutting device to be quickly removed for cutting out of reach places; that allows auxiliary supplies to be kept within reach; that allows the cutting device to be maintained (e.g., allows a string-type trimmer to be reloaded with string, etc.) and re-fueled without the operator dismounting the vehicle; that using a control handle allows precise cutting around small plants, etc.; that is light weight for use by persons with disabilities; that is affordable; that reduces soiling of clothing and footwear when cutting grass, etc.; that enables persons with one leg or other disabilities to operate a cutting device; and that provides 180° of swivel to allow selective cutting, etc.

Although the present invention has been described and illustrated with respect to a preferred embodiment and a preferred use therefor, it is not to be so limited since modifications and changes can be made therein which are within the full intended scope of the invention.

I claim:

1. An apparatus for supporting a string trimmer from a lawn mower and for allowing the operator of said lawn mower to use said string trimmer while said string trimmer is supported from said lawn mower, said lawn mower having a deck with a face surface; said string trimmer including an elongated shaft, a cutting head attached to one end of said shaft, and a motor for activating said cutting head; said apparatus comprising:

(a) a base for attachment to said face surface of said deck of said lawn mower;

(b) a support arm member having a first end for attachment to said base, a midportion, and a second end;

(c) hanger means attached to said support arm for suspending said string trimmer from said support arm; said hanger means including a cradle member for cradling a portion of said string trimmer, said cradle member having a first end and a second end; said hanger means including an elongated first member having a first end attached to said support arm and having a second end attached to said first end of said cradle member; and in which said hanger means includes an elongated second member having a first end attached to said support arm and having a second end attached to said second end of said cradle member; said first and second members are flexible to allow said string trimmer to be moved while suspended from said support arm by said hanger means;

(d) a first holder attached to said support arm for holding a portion of said string trimmer;

(e) a second holder attached to said support arm for holding another portion of said string trimmer;

(f) control handle means for allowing the operator of said lawn mower to precisely control the position of said cutting head of said string trimmer from said lawn mower; said control handle means having a first end for attachment to said string trimmer and having a second end for hooking onto said first holder; and (g) attachment means for rotatably attaching said support arm to said base to allow the operator of said lawn mower to move said cutting head of said string trimmer in an arc about said base while said string trimmer remains suspended from said support arm.

2. The apparatus of claim 1 in which said attachment means includes a post having a first end for attachment to said base and having a second end for rotational attachment relative to said first end of said support arm; said post having a longitudinal axis and attached to said base with said longitudinal axis thereof substantially perpendicular to said face surface of said deck of said lawn mower.

3. An apparatus for supporting a cutting device from a vehicle and for allowing the operator of said vehicle to use said cutting device while said cutting device is supported from said vehicle, said cutting device including an elongated shaft, a cutting head attached to one end of said shaft, and means for activating said cutting head; said apparatus comprising;

(a) a base for attachment to said vehicle;

(b) a support arm member having a first end for attachment to said base, a midportion, and a second end; and (c) hanger means attached to said support arm for suspending said cutting device from said support arm, said hanger means is flexible to allow said cutting device to be moved while suspended from said support arm by said hanger means, said hanger means including a cradle member for cradling a portion of said cutting device, said cradle member having a first end and a second end; said hanger means including an elongated, flexible first member having a first end attached to said support arm and having a second end attached to said first end of said cradle member; and said hanger means including an elongated, flexible second member having a first end attached to said support arm and having a second end attached to said second end of said cradle member.

4. An apparatus for supporting a cutting device from a vehicle and for allowing the operator of said vehicle to use said cutting device while said cutting device is supported from said vehicle, said cutting device including an elongated shaft, a cutting head attached to one end of said shaft, and means for activating said cutting head; said apparatus comprising:

(a) a base for attachment to said vehicle;

(b) a support arm member having a first end for attachment to said base, a midportion, and a second end; and (c) hanger means attached to said support arm for suspending said cutting device from said support arm, said hanger means is flexible to allow said cutting device to be moved while suspended from said support arm by said hanger means;

(d) a first holder attached to said support arm for holding a portion of said cutting device; and (e) a second holder attached to said support arm for holding another portion of said cutting device.

5. The apparatus of claim 4 including control handle means for allowing the operator of said vehicle to precisely control the position of said cutting head of said cutting device from said vehicle; said control handle means having a first end for attachment to said cutting device and having a second end.

6. The apparatus of claim 5 in which said first holder includes a hook for hooking onto a portion of said control handle means.

7. The apparatus of claim 6 in which said second holder includes a hook for hooking onto a portion of said cutting device.

8. The apparatus of claim 4 including an auxiliary holder attached to said support 9. The apparatus of claim 4 including a first auxiliary holder attached to said support arm and a second auxiliary holder attached to said support arm.

* * * * *